(12) United States Patent
Biel

(10) Patent No.: US 9,272,424 B2
(45) Date of Patent: Mar. 1, 2016

(54) GRIPPER FOR A CONTACT LENS AND PROCESS FOR TRANSPORTING A CONTACT LENS

(71) Applicant: Novartis AG, Basel (CH)

(72) Inventor: Roger Biel, Aschaffenburg (DE)

(73) Assignee: NOVARTIS AG (CH)

( * ) Notice: Subject to any disclaimer, the term of this patent is extended or adjusted under 35 U.S.C. 154(b) by 0 days.

(21) Appl. No.: 14/482,534

(22) Filed: Sep. 10, 2014

(65) Prior Publication Data

US 2015/0071755 A1   Mar. 12, 2015

Related U.S. Application Data

(60) Provisional application No. 61/876,541, filed on Sep. 11, 2013.

(51) Int. Cl.
    *B25J 15/06*    (2006.01)
    *B25J 11/00*    (2006.01)
    *B29D 11/00*    (2006.01)

(52) U.S. Cl.
    CPC .......... *B25J 15/0666* (2013.01); *B25J 11/005* (2013.01); *B29D 11/0024* (2013.01)

(58) Field of Classification Search
    USPC ......... 294/1.2, 183, 185, 186, 188, 64.3, 902; 206/1.5, 5.1; 901/40; 269/21; 53/432
    See application file for complete search history.

(56) References Cited

U.S. PATENT DOCUMENTS

| | | | | |
|---|---|---|---|---|
| 5,050,919 A | * | 9/1991 | Yakou | 294/2 |
| 5,308,132 A | * | 5/1994 | Kirby et al. | 294/185 |
| 5,716,540 A | * | 2/1998 | Matiacio et al. | 249/117 |
| 6,139,078 A | * | 10/2000 | Bodiker et al. | 294/183 |

(Continued)

FOREIGN PATENT DOCUMENTS

| | | |
|---|---|---|
| EP | 1029789 A2 | 8/2000 |
| JP | 2010115743 A | 5/2010 |
| WO | 2011026868 A1 | 3/2011 |

OTHER PUBLICATIONS

PCT International Search Report dated Nov. 12, 2014, International Application No. PCT/EP2014/069290, International filing Date Sep. 10, 2014.

(Continued)

*Primary Examiner* — Paul T Chin
(74) *Attorney, Agent, or Firm* — Robert A. Ambrose

(57) ABSTRACT

A gripper (1) for a contact lens comprises a gripper head (2) having a bearing surface (21) for the contact lens (L) to adhere thereto. The gripper (1) further comprises an ejector (23) for mechanically displacing the contact lens, at least partially, away from the bearing surface (21). Also a process for transporting a contact lens (L) from a start location to a destination location, comprising the steps of providing the gripper (1) and positioning the gripper head (2) of the gripper at the start location with its bearing surface (21) adjacent to the contact lens (L) at a distance sufficiently close to the contact lens (L) to cause the contact lens to adhere to the bearing surface (21), moving the gripper (1) together with the contact lens (L) adhered to the bearing surface (21) to the destination location, and actuating the ejector (23, 24) in order to mechanically displace the contact lens (L) at least partially from the bearing surface (21) until the contact lens comes into sufficient contact with a receiving liquid at the destination location in order to release the contact lens (L) from the gripper (1).

15 Claims, 4 Drawing Sheets

(56) References Cited

U.S. PATENT DOCUMENTS

| | | | |
|---|---|---|---|
| 6,494,021 B1 * | 12/2002 | Schlagel et al. | 53/432 |
| 8,387,782 B2 * | 3/2013 | Biel et al. | 206/1.5 |
| 8,425,175 B2 * | 4/2013 | Kobayashi et al. | 414/752.1 |
| 8,801,067 B2 * | 8/2014 | Lassig et al. | 294/183 |
| 9,010,930 B2 * | 4/2015 | Straub | 351/159.01 |
| 9,033,386 B2 * | 5/2015 | Biel et al. | 294/183 |
| 2002/0149744 A1 * | 10/2002 | Biel et al. | 351/177 |
| 2004/0074525 A1 * | 4/2004 | Widman et al. | 134/34 |

OTHER PUBLICATIONS

PCT Written Opinion of the International Searching Authority dated Nov. 12, 2014, International Application No. PCT/EP2014/069290, International filing Date Sep. 10, 2014.

\* cited by examiner

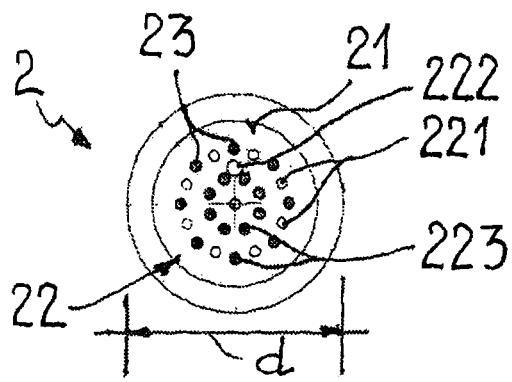
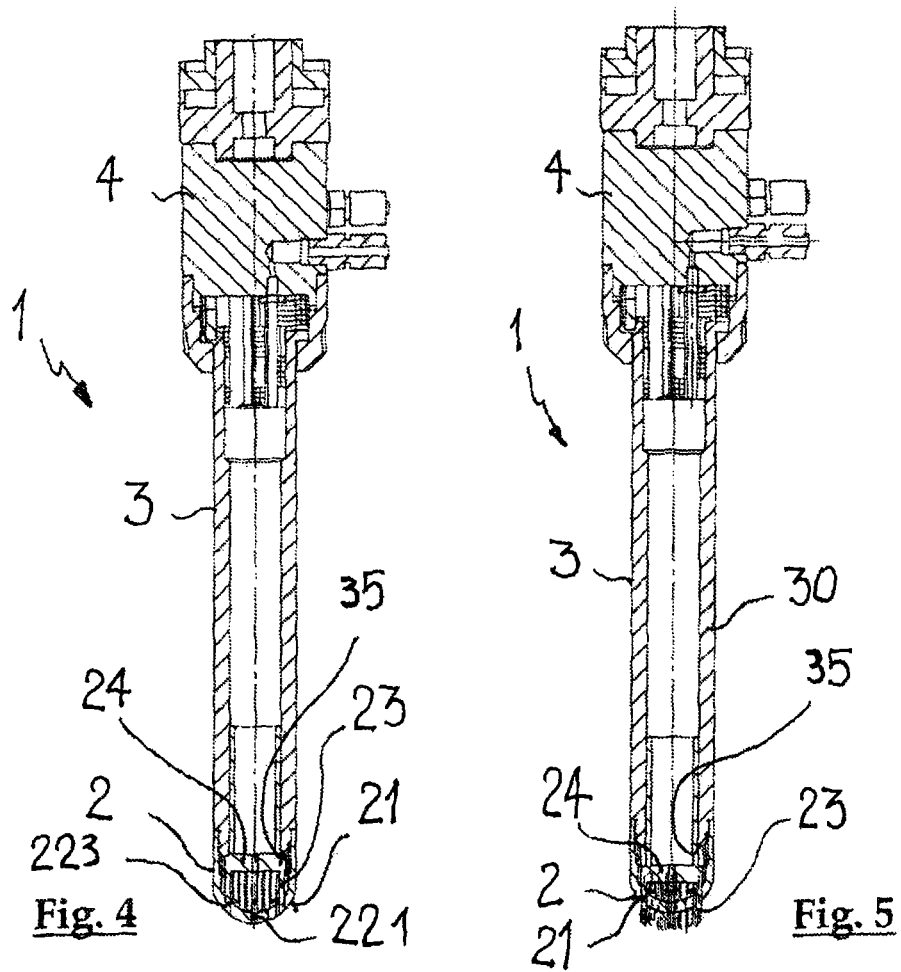
Fig. 3
Fig. 4
Fig. 5

GRIPPER FOR A CONTACT LENS AND PROCESS FOR TRANSPORTING A CONTACT LENS

This application claims the benefit under 35 USC §119 (e) of U.S. provisional application Ser. No. 61/876,541 filed Sep. 11, 2013, incorporated herein by reference in its entirety.

FIELD

The invention relates to a gripper for a contact lens and to a process for transporting a contact lens from a start location to a destination location.

BACKGROUND

In the automated production of contact lenses in general, but especially in the production of large batches of contact lenses, as is the case for example with disposable contact lenses, it is necessary at certain stations in the production process to be able to manipulate the contact lenses safely, quickly and efficiently. An example of such manipulation of a contact lens is when the contact lens is removed from a test cell in which said contact lens has been placed in a liquid, for example in water, in order to inspect it (e.g. by image processing).

To remove the inspected contact lens from the test cell known devices called grippers are typically used. Grippers are also used at other stations in such automated production process. The contact lens is gripped with the aid of the gripper, and in the example described above the gripper together with the gripped contact lens is removed from the test cell. The gripper together with the contact lens is then moved, for example, to a receptacle which can be part of the final package for the contact lens and into which a storage solution (e.g. saline) has been or will be dispensed. The contact lens is then released from the gripper and deposited in the receptacle. The receptacle is then covered with a foil which is later on welded or sealed to the receptacle, and after subsequent autoclaving the final package can be distributed.

In the above-described removal of the contact lens from the test cell, or other environment from which it is removed, and the subsequent dispensing of the contact lens into a receptacle in which a saline is (or will be) present, care must be taken to ensure that only a very small amount of water, preferably no water at all, is entrained with the contact lens, otherwise the saline may become diluted. This is a problem which is not at all easy to solve, because the contact lens in the above-mentioned test cell has to be sucked from "under water" (with the result that water is necessarily also sucked out with the lens), then transported to the receptacle which is part of the final package, and finally deposited in this receptacle, for which purpose the contact lens has to be released again from the gripper. In addition, the contact lens has to be gripped securely by the gripper (even "under water"), and in the case of small receptacles the contact lens has to be reliably deposited in the receptacle so that it cannot later get damaged during the welding or sealing of the cover foil.

A gripper suitable to fulfill these requirements is known from WO 2011/026868 A1. Removal of the contact lens from the bearing surface of this gripper is accomplished by discontinuing the underpressure and by applying overpressure through the suction openings in the bearing surface. Due to the overpressure applied through the suction openings the contact lens is blown off the bearing surface. However, care must be taken in controlling the overpressure to ensure that the air flow through the suction openings in the bearing surface of the gripper does not have an adverse effect on the storage solution contained in the receptacle or on the contact lens deposited in the receptacle. For example, if too high an overpressure is applied the storage solution (e.g. saline) which has been dispensed into the receptacle before, may at least partially be blown out of the receptacle. This may lead, for example, to problems in the subsequent welding or sealing of the cover foil to the receptacle, since droplets blown out of the receptacle may deposit in the area where the cover foil is to be sealed to the receptacle, so that welding or sealing may be incomplete. Or, in an even worse case the contact lens itself may be blown out of the receptacle.

On the other hand, in case too low an overpressure is applied the contact lens may not be completely released from the gripper but instead may at least partially adhere to the bearing surface of the gripper. In both cases, if a contact lens has been blown out of the receptacle or if it has not been completely released from the gripper despite the application of overpressure, no contact lens is contained in the receptacle so that the welded or sealed package does not contain a contact lens. Such package and any additional packages connected to such package (for example when being sealed by a common foil extending over a plurality of packages) must be sorted out and discarded, and cannot be distributed. In addition, when the contact lens has not successfully been released from the bearing surface and the gripper subsequently returns to its starting position to grip (suck) another contact lens, it may be unable to grip the next contact lens since the previously gripped contact lens still adheres to the bearing surface.

Therefore, there exists a need to ascertain that a contact lens gripped by a gripper at a starting location is safely released from the bearing surface of the gripper at a destination location. Concurrently, adverse effects due to too high an overpressure or due to too low an over-pressure applied through the suction openings in the bearing surface of the gripper shall be avoided.

SUMMARY

The present invention suggests a gripper as it is specified by the features of the independent claim directed to a gripper. Advantageous embodiments of the gripper are the subject of the corresponding dependent claims. More specifically, the gripper for a contact lens according to the invention comprises a gripper head having a bearing surface for the contact lens to adhere thereto. The gripper further comprises an ejector for mechanically displacing the contact lens, at least partially, away from the bearing surface.

In some embodiments of the gripper according the invention the ejector may comprise a number of ejector pins, and the ejector is actuatable such that the ejector pins are movable from a rest position in which the ejector pins do not interfere with the bearing surface, to an ejection position in which the ejector pins protrude axially beyond the bearing surface, and vice versa.

In some embodiments of the gripper according to the invention, in the rest position the ejector pins are arranged in the interior of the gripper. The bearing surface comprises a plurality of guide openings through which the ejector pins protrude axially beyond the bearing surface when they are in the ejection position.

In some further embodiments, the bearing surface comprises a plurality of suction openings through which underpressure can be applied from the interior of the gripper in order to suck the contact lens against the bearing surface.

In still some further embodiments of the gripper according to the invention the guide openings, at least partially, form a part of the plurality of suction openings in the bearing surface.

In yet some further embodiments of the gripper the ejector is mechanically, pneumatically, or hydraulically actuatable.

In some embodiments of the gripper according to the invention, the plurality of ejector pins are mounted on a common plunger which is arranged axially displaceable in the interior of the gripper.

In some embodiments of the gripper according to the invention, in the ejection position the plurality of ejector pins axially protrudes beyond the bearing surface for a distance of 1 mm to 10 mm, in particular for a distance of 1 mm to 5 mm.

In still some further embodiments of the gripper according to the invention, the bearing surface may further comprise a detection opening through which a test-underpressure separate from the underpressure for sucking the contact lens against the bearing surface may be applied.

In yet some further embodiments of the gripper according to the invention, the gripper may comprise a detection tube which is arranged in the interior of the gripper. A distal end of the detection tube is connected with the detection opening in a fluid-tight manner so as to allow application of the test-underpressure through the detection opening.

In still some further embodiments of the gripper according to the invention, the gripper may further comprise a vacuum tube extending through the interior of the gripper. A distal end of the vacuum tube is arranged in the interior of the gripper and at a short distance from the plurality of suction openings in the bearing surface through which the underpressure can be applied for sucking the contact lens against the bearing surface.

In some embodiments of the gripper according to the invention, the gripper may comprise a leakage stream channel being connected with an inlet for a leakage stream. The leakage stream channel is in fluid connection with the plurality of suction openings in the bearing surface and with the distal end of the vacuum tube.

In still some further embodiments of the gripper according to the invention the bearing surface is a convexly curved smooth surface In yet some further embodiments of the gripper according to the invention the bearing surface has an outer diameter which is larger than that of a contact lens to be sucked against the bearing surface.

The afore-described embodiments of the gripper according to the invention are advantageous in a number of aspects. By mechanically displacing the contact lens at least partially from the bearing surface of the gripper the adherence of the contact lens to the bearing surface is greatly reduced. If the contact lens is not completely released from the bearing surface by this mechanical displacement alone, then at least the adhesive forces between the front surface of the contact lens and a receiving liquid (e.g. saline) with which the contact lens comes into contact are higher than the adhesive forces between the rear surface of the contact lens and the ejector and the bearing surface of the gripper, respectively. The contact lens is thus safely released from the bearing surface of the gripper (e.g. it is placed into the receptacle). As is evident, there is no need for any overpressure at all. Thus, no overpressure installations (e.g. pressurized air) for the grippers are needed anymore. In addition, due to elimination of the need for overpressure there is no more risk for receiving liquid (e.g. saline) to be blown out of the receptacle and to be spilled onto the area where the foil is to be welded or sealed to the receptacle, nor is there any risk for the contact lens to be blown out of the receptacle. Also, while gripping of the contact lens with the aid of underpressure may be preferred, gripping of the contact lens may generally occur only with the aid of adhesion forces between the contact lens and the bearing surface of the gripper. Accordingly, application of underpressure for gripping the contact lens is not mandatory, so that in general a vacuum source is not mandatory. Once the contact lens has been gripped, it adheres to the bearing surface and is released from the bearing surface by the (at least partial) mechanical displacement of the contact lens from the bearing surface.

In the ejection position the ejector pins at least partially have displaced the contact lens from the bearing surface of the gripper. Thus, the rear surface of the contact lens either to a large extent or even completely rests on the distal ends of the ejector pins. If the contact lens is completely displaced from the bearing surface of the gripper, the adherence of the contact lens to the gripper is only determined by the adhesive forces between the rear surface of the contact lens and the distal ends of the ejector pins. Accordingly, the contact lens can be released from the gripper particularly easy as the front surface contacts the receiving liquid. But even if the contact lens partially adheres to the bearing surface, the adhesive forces between the receiving liquid and the front surface of the contact lens are higher than the adhesive forces between the rear surface of the contact lens and the bearing surface and the distal ends of the ejector pins.

By arranging the ejector pins axially displaceable within the gripper a very compact constructive design of the gripper is achieved which facilitates operation as well as replacement of the gripper, should this become necessary. The ejector pins are axially movable through the guide openings in the bearing surface to axially protrude beyond the bearing surface, and are guided in the guide openings. Such construction, once mounted, eliminates the need for further alignment means or guiding means. In one embodiment of the gripper according to the invention, the distal ends of the ejector pins are retracted but still arranged within the guiding openings even when the ejector is in the rest position.

In case underpressure is applied for gripping the contact lens, the underpressure is applied through the suction openings in the bearing surface. Due to the fact that some of the suction openings may also serve as guide openings for the ejector pins, the gripper head of prior art grippers does not require any extra openings serving as guide openings. Accordingly, an already optimized number of suction openings in the bearing surface does not have to be increased by an additional number of guide openings.

In case of a purely mechanical or hydraulical actuation of the ejector a source of compressed gas, usually air, for the grippers can be completely dispensed with at this transfer station in the automated production line. Of course, in case the ejector is pneumatically actuated this requires the presence of a source of compressed air at the transfer station.

By having the ejector pins mounted on a common plunger, only the plunger must be actuated in order to move the ejector pins from the rest position into the ejection position and vice versa. This constructional option not only facilitates operation of the ejector pins but also the stability of their alignment with the guide openings in the bearing surface.

The ejector pins may have to be axially displaced only for a very small distance (1 mm to 10 mm, in particular 1 mm to 5 mm), which is sufficient to break up the adhesive forces between the bearing surface of the gripper head and the rear surface of the contact lens.

The test-underpressure which is applicable through the detection opening assists to clearly indicate during the transport of the contact lens to the destination location and on the way back to the start location whether or not a contact lens adheres to the bearing surface. In this context the term "test-underpressure" designates a separate underpressure which is applied to the detection opening only and which is independent from the underpressure acting on the suction openings for sucking the contact lens against the bearing surface. In case a test-underpressure of a predetermined magnitude is applied through the detection opening (e.g. with the aid of a vacuum source) and a contact lens adheres to the bearing surface of the gripper head, then the magnitude of the test-underpressure is maintained, because the adhering contact lens closes the detection opening. In case no lens adheres to the bearing surface, due to the applied test-underpressure air from the environment is sucked in through the detection opening leading to a strong reduction or even to a collapse of the test-underpressure. The reduction or collapse of the test-underpressure will be immediately detected at the vacuum source providing the underpressure. Thus, reliable detection is possible of whether or not a contact lens adheres to the bearing surface. In this manner, it is possible to detect whether or not a lens has been successfully sucked against the bearing surface. Also, it is possible to detect whether or not a contact lens has been successfully released from the bearing surface at a destination location.

A detection tube arranged in the interior of the gripper with the distal end of the detection tube being connected with the detection opening in a fluid-tight manner is an easy constructional approach ascertaining that the test-underpressure is not influenced by the underpressure for sucking the contact lens against the bearing surface of the gripper.

The distal end of a vacuum tube extending through the interior of the gripper for applying the underpressure for sucking the contact lens against the bearing surface may end at a distance of 0.1 mm to 5 mm, preferably at a distance of about some tenths of a millimeter, for example about 0.2 mm or about 0.3 mm up to about 1 millimeter from the suction openings in the bearing surface of the gripper head. This allows underpressure to be applied to the plurality of suction openings, and simultaneously a leakage stream may be allowed to flow towards the plurality of suction openings in the bearing surface. The leakage stream assists in transporting away any liquid which has been sucked into the interior of the gripper (e.g. when the lens is sucked from "under water" in the test cell) by the application of underpressure through the plurality of suction openings in the bearing surface. The magnitude of the leakage stream is selected such that it does not essentially affect the underpressure applied through the suction openings in order to ascertain that the lens remains sucked against the bearing surface. For that purpose a leakage stream inlet may be provided. Such leakage stream inlet may be, for example, a small leakage hole in the body of the gripper or the gripper head, or any other suitable leaking stream inlet. For example, after a contact lens has been inspected in a liquid, such as water, contained in a test cell and the contact lens is now to be gripped and transported to the receptacle, the gripper must grip (suck) the contact lens from "under water".

In doing so, not only the contact lens is sucked against the bearing surface of the gripper but also water is sucked into the interior of the gripper. In order to carry over as little water as possible into the receptacle where the contact lens is to be deposited and which already contains a storage liquid, for example 50 µl to 150 µl of saline, the application of underpressure to the suction openings and the simultaneously flowing leakage stream have the effect, that water which has been sucked into the interior of the gripper is transported into the underpressure tube. Such water is then transported away and may be removed by a liquid separator so that it does not damage the vacuum source.

The convexly curved smooth bearing surface is free from channels, grooves or the like, where liquid (e.g. water) could collect. As the lens has been sucked against and adheres to the bearing surface, the smoothness of the bearing surface prohibits any fluid flowing in any channels, grooves or the like between the lens and the bearing surface, thus preventing an unintentional drying out of the contact lens.

In case the bearing surface of the gripper head has an outer diameter larger than that of the contact lens to be sucked, the contact lens does not extend beyond the outer diameter of the gripper so that upon removal of the gripper from a test cell or from any other container, the lens cannot get damaged in the region of the contact lens edge as long as it adheres to the bearing surface of the gripper.

Another aspect of the present invention is directed to a process for transporting a contact lens from a start location to a destination location, the process comprising the steps of:

providing a gripper according to any one of the embodiments of the invention as described above, positioning the gripper head of the gripper at the start location with its bearing surface adjacent to the contact lens at a distance sufficiently close to the contact lens to cause the contact lens to adhere to the bearing surface, moving the gripper together with the contact lens adhered to the bearing surface to the destination location, and actuating the ejector in order to mechanically displace the contact lens at least partially from the bearing surface until the contact lens comes into sufficient contact with a receiving liquid at the destination location in order to release the contact lens from the gripper.

As already mentioned above, by mechanically displacing the contact lens at least partially from the bearing surface of the gripper the adherence of the contact lens to the bearing surface is considerably reduced. Thus, the adhesive forces between a front surface of the contact lens and a receiving liquid (e.g. saline) at a destination location (e.g. the location where a receptacle of a final package for the contact lens is arranged) is larger than the adhesive forces between a rear surface of the contact lens and the ejector and the bearing surface of the gripper, respectively. Thus, it is ensured that the contact lens is safely released from the bearing surface and transferred into the receptacle. By optionally applying an additional test-underpressure through a detection opening in the bearing surface either when the contact lens has been gripped and adheres to the bearing surface of the gripper head, or after the contact lens has been released from the bearing surface of the gripper head, or both, it is possible to detect whether a contact lens has been successfully gripped and whether later on the contact lens has been successfully released from the gripper.

Optionally, the method may comprise a step of applying underpressure through a plurality of suction openings provided in the bearing surface of the gripper so as to suck the contact lens. This step may, again optionally, comprise applying underpressure and at the same time allowing a leakage stream to flow towards the suction openings. The magnitude of the leakage stream may be chosen such that it does not essentially affect the underpressure applied. The advantages of applying underpressure and at the same time allowing a leakage stream to flow towards the at least one opening in the bearing surface have already been explained above in connection with the corresponding embodiment of the gripper according to the invention (reduction or prevention of carry-over of water).

In another embodiment of the process according to the invention the step of applying a test-underpressure through a detection opening in the bearing surface may be performed a predetermined time interval after the application of underpressure through the suction openings in the bearing surface has started. This embodiment of the process is suitable to detect whether a lens has been successfully gripped and adheres to the bearing surface of the gripper head. In addition, the predetermined time interval may be selected such that in case the gripper has gripped the lens in a test cell "under water", the test-underpressure is applied only after the gripper has been moved out of the test cell, so that no water is sucked in through the detection opening.

In a still further embodiment of the process according to the invention, the step of applying a test-underpressure through the detection opening in the bearing surface is performed a predetermined time interval after actuation of the ejector for mechanically displacing the contact lens, at least partially, from the bearing surface, and even more preferably after the ejector has been moved back to the rest position of the ejector pins. This embodiment of the process is suitable to detect whether a lens has been successfully released and does no longer adhere to the bearing surface of the gripper head. The process of detecting a successful release of the contact lens can be performed either in combination with a process in which the adherence of the lens to the bearing surface is detected, or it can be performed without such previous detection process. The predetermined time interval may be chosen long enough that under normal conditions the lens should have been released at the time the test-underpressure is applied.

BRIEF DESCRIPTION OF THE DRAWINGS

Further advantages of the invention will become apparent from the following description of an exemplary embodiment thereof, reference being made to the schematic drawings, which are not to scale, in which:

FIG. 3 shows a bottom view onto a bearing surface of the gripper;

FIG. 4 shows a longitudinal section of the gripper of FIG. 1;

FIG. 5 shows a longitudinal section of the gripper of FIG. 2 with the ejector pins in the ejection position;

DETAILED DESCRIPTION

Figures 1, 2:
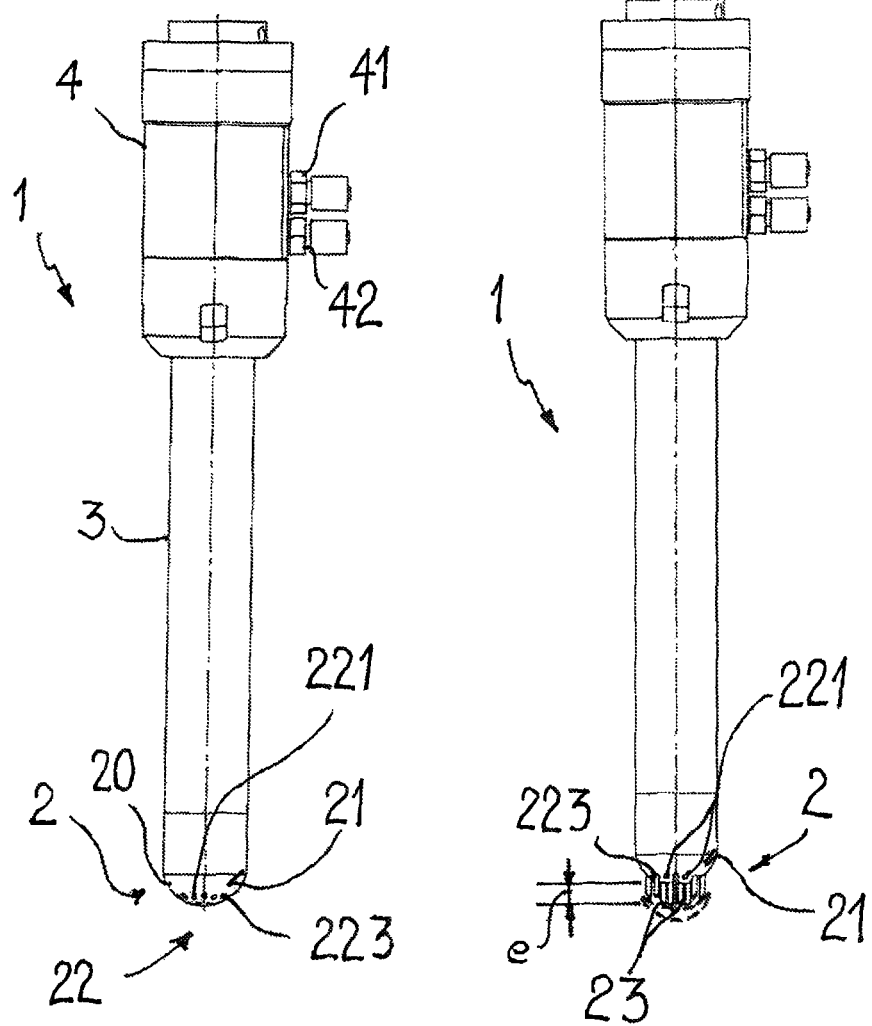
FIG. 1 shows a side view of an embodiment of the gripper according to the invention.
FIG. 2 shows the gripper of FIG. 1 with the ejector pins in the ejection position.

FIG. 1 shows an embodiment of the gripper 1 according to the invention. Gripper 1 comprises a gripper head 2 having a bearing surface 21 which comprises a plurality of openings 22, which are bores extending through a distal wall 20 of the gripper head 2. Gripper head 2 forms the distal end of an elongated gripper body 3 which extends from the said distal end of the gripper to a mounting and supply block 4 of the gripper at the proximal end of the gripper. Mounting and supply block 4 is provided with inlet ports 41, 42 for the attachment of supply tubes (not shown). Bearing surface 21 is convexly curved outwardly and has a smooth surface without any channels, grooves or the like. Openings 22 in the bearing surface 21 on the one hand comprise pure suction openings 221 through which underpressure can be applied for sucking a contact lens against bearing surface 21. Some other of the openings 22 in bearing surface 21 are guide openings 223 for guiding ejector pins (not shown in FIG. 1, see FIG. 2), these ejector pins being arranged in FIG. 1 in the rest position in the interior of the gripper.

FIG. 2 shows the gripper 1 with the ejector pins in the ejection position. More specifically, the ejector pins 23 which are axially displaceable (meaning that they are movable in the direction of the longitudinal axis of the gripper) from the rest position in which they are arranged in the interior of the gripper (see FIG. 1) through the guide openings 223 in the bearing surface 21 to an ejection position. In the ejection position the ejector pins 23 protrude beyond the bearing surface 21 of gripper head 2 (see FIG. 2) for a distance e of about 1 mm to about 10 mm, in particular 1 mm to 5 mm. Ejector pins 23 preferably have blunt free ends to prevent a contact lens adhered thereto from getting damaged. Ejector pins 23 may be made of metal or of plastic and serve for mechanical displacement of the contact lens away from the bearing surface 21.

In FIG. 3 an exemplary arrangement of the openings 22 in bearing surface 21 is shown. For example, openings 22 may be arranged along concentric circles around a central opening arranged on the longitudinal axis of the gripper. In FIG. 3, the guide openings 223 for guiding the ejector pins 23 are drawn blackened. Depending on where the ejector pins 23 are arranged in the interior of the gripper when they are in the rest position, both the plurality of suction openings 221 and the plurality of guide openings 223 (i.e. all openings 22) can be used for applying underpressure (suction) for creating a suction force on a contact lens to be gripped. In particular, in case the rest position of the ejector pins 23 is such that the ejector pins 23 are not arranged within the guide openings 223, then the guide openings 223 can also be used for applying suction therethrough in order to suck a contact lens against bearing surface 21. In case the rest position of the ejector pins 23 is such that the ejector pins 23 are arranged within the guiding openings 223 but have a diameter considerably smaller than the inner diameter of the guide openings 223, the guide openings 223 also may also allow for some suction to be applied therethrough to suck the contact lens. However, if the diameter of the ejector pins 23 fits the inner diameter of the guide openings 223, no suction (or practically no suction) can be applied therethrough even if the ejector pins 23 are in the rest position.

FIG. 3 further shows a detection opening 222 arranged in the bearing surface 21, and this detection opening 222 allows for the application of an additional test-underpressure to detect the presence or absence of a contact lens, as will be explained in more detail hereinafter. It is to be noted that the shown arrangement of the openings 22 in the bearing surface 21 is only exemplary and may be varied depending on specific requirements. Bearing surface 21 has an outer diameter d which is preferably larger than that of the contact lens to be sucked and transported, so that once the contact lens has been sucked and adheres to bearing surface 21 it cannot get damaged or injured during transportation from a start location to a desired destination location. In particular, the edge of the contact lens which is important for the wearing comfort of a contact lens cannot get damaged or injured due to the bearing surface extending radially beyond the edge of the contact lens adhered to the bearing surface.

FIG. 4 shows a longitudinal section of the gripper 1 of FIG. 1. Gripper head 2 and gripper body 3 are both hollow. Gripper body 3 may be releasably attached to supply block 4, e.g. by a bayonet coupling. The ejector pins 23 are shown in the rest position in the interior of gripper 1. As indicated ejector pins 23 are aligned with and protrude into the guide openings 223 without interfering with the bearing surface 21 (i.e. the blunt distal ends of the ejector pins 23 do not extend beyond the bearing surface 21). The central suction opening (the one arranged on the longitudinal axis of the gripper) is indicated at 221. The ejector pins 23 are mounted on a common plunger 24, which is arranged axially displaceable (i.e. in the direction of the longitudinal axis of the gripper) in the interior of the gripper 1. The plunger 24 may be driven mechanically, pneumatically or hydraulically. A circumferentially extending shoulder of the plunger 24 and a corresponding circumferentially running rim 35 in the interior of gripper body 3 define the rest position of the plunger 24 and the ejector pins 23.

FIG. 5 shows a longitudinal section of the gripper 1 with the ejector pins 23 in the ejection position. When compared with FIG. 4, the plunger 24 has been moved forward mechanically, pneumatically or hydraulically until a leading circumferential edge of the plunger 24 abuts against the inner surface of the distal wall 20 of the gripper head 2. The ejector pins 23 then extend through the guide openings 223 and protrude beyond the bearing surface 21 of the gripper head 2. The circumferentially running rim 35 already mentioned above in connection with FIG. 4 is arranged in the interior of gripper body 3.

Figure 6:
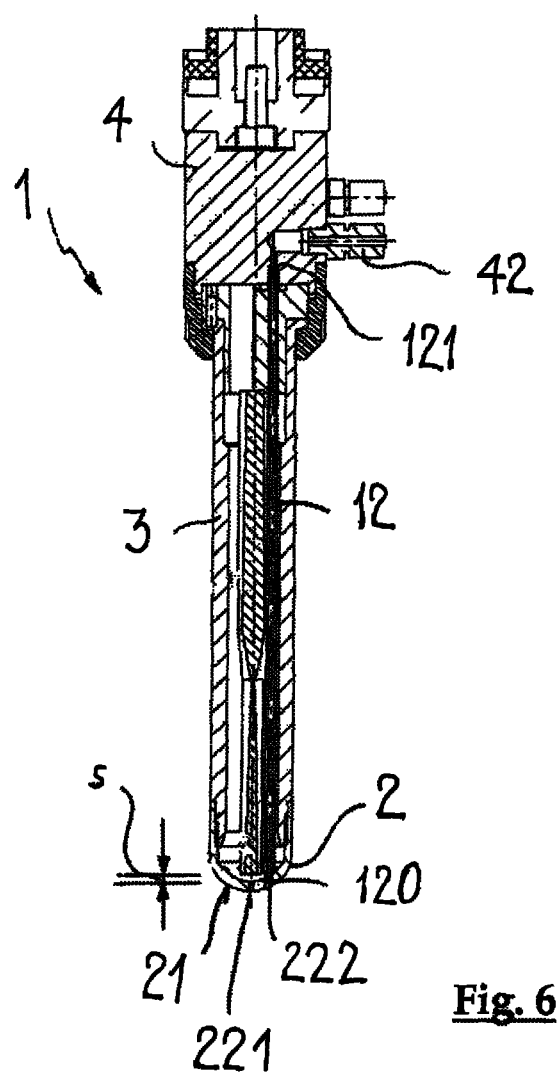
FIG. 6 shows a longitudinal section of the gripper without ejector for illustration of the contact lens presence detection function.

FIG. 6 shows a further longitudinal sectional view of the gripper of FIG. 1. For the sake of enhanced clarity, the plunger 24 with the ejector pins 23 are not shown. The central suction opening 221 is again arranged on the longitudinal axis of the gripper 1. In addition, a detection opening 222 is shown. A detection tube 12 of a small diameter extends through the interior of the hollow gripper body 3 and through the gripper head 2, with a distal end 120 of detection tube 12 being fittingly arranged in the detection opening 222 so that there is no fluid communication with the hollow interior of the gripper. The proximal end 121 of detection tube 12 is fluid-tightly connected with inlet port 42 at supply block 4 so that a test-underpressure may be applied to detection opening 222.

This test-underpressure functions as an indicator of whether or not a contact lens adheres to the bearing surface 21 of the gripper head 2. If a contact lens adheres to the bearing surface 21, it closes detection opening 222 and, accordingly, the applied test-underpressure will be maintained. This indicates that the contact lens has been successfully gripped and adheres against bearing surface 21. If no contact lens adheres to the bearing surface 21, the applied underpressure is greatly reduced or even collapses. This may serve as an indicator, that a contact lens has successfully been released from the bearing surface 21 of the gripper head 2 at a desired destination location (for example it serves as an indicator as to whether a contact lens has been released from the gripper into a receptacle), or may serve as an indicator that a contact lens has not been successfully gripped.

Figure 7:
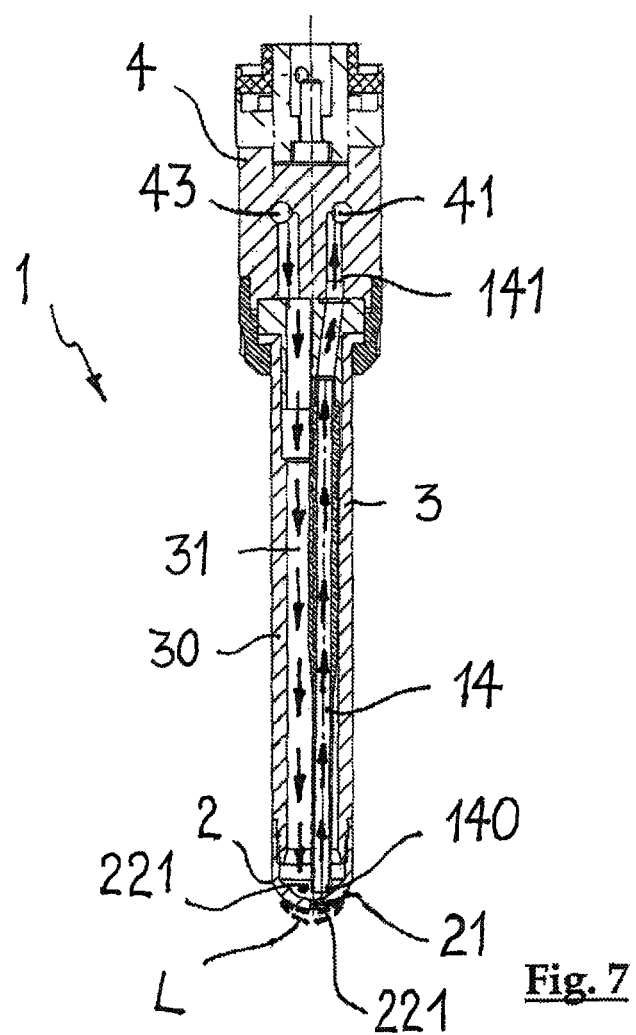
FIG. 7 shows a 90° rotated longitudinal section of the gripper of FIG. 6 without ejector for illustration of the suction function.

FIG. 7 shows a yet further longitudinal section of the gripper 1, however, the gripper has been rotated about the longitudinal axis of the gripper by 90 degrees. Again, the central suction opening 221 arranged on the longitudinal axis of the gripper can be seen. A vacuum tube 14 extends from inlet port 41 through the interior of hollow gripper body 3 into the hollow gripper head 2. A distal end 140 of the vacuum tube 14 is arranged in the interior of the gripper at a short distance s (see FIG. 6) from the suction openings 221 and guide openings 223 in the bearing surface 21. The short distances can be in the range of 0.1 mm to 5 mm, and can preferably amount from some tenths of a millimeter, for example about 0.2 mm or about 0.3 mm up to about 1 millimeter from the openings in the bearing surface 21.

A proximal end 141 of the underpressure tube 14 is connected with inlet port 41 which allows the application of underpressure through the underpressure tube 14. A contact lens L adheres to bearing surface 21 of the gripper head 2. A leakage pressure channel 31 is formed by the interior of the hollow gripper body 3 and surrounds vacuum tube 14. Leakage pressure channel 31 may be connected with the environment via an additional inlet port 43 in the support block 4. Alternatively, the longitudinal side wall 30 of the gripper body 3 may be provided with at least one through-bore. The at least one through-bore may be located close to the proximal end of gripper body 3, in the vicinity of supply block 4, in order to avoid the entry of any liquid through this bore into the hollow interior of gripper body 3.

When the gripper 1 is to grip a contact lens L from a start location, for example from a test cell and "under water", the gripper is lowered until bearing surface 21 of the gripper head 2 is arranged in close proximity to the contact lens L to be sucked. Underpressure is then applied through inlet port 41, vacuum tube 14 and finally through suction openings 221 (and perhaps, depending on the rest position and diameter of the ejector pins 23, even through the guide openings 223) in the bearing surface 21. Due to the underpressure applied some water may also be sucked from the test cell into the interior 31 of gripper 1. Also, the contact lens L is sucked against the bearing surface 21. A small leakage stream of air may be allowed to enter the interior 31 of gripper body 3. This leakage air stream flows towards the distal end of vacuum tube 14 where the suction is applied and assists the transportation of water that has been sucked into the interior of the gripper 1 away through the vacuum tube 14. From there the water may be transported to a liquid separator so that it does not damage the vacuum source.

The leakage stream is controlled such that it does not essentially affect the suction force acting upon the contact lens L due to underpressure applied through vacuum tube 14. Thus, the contact lens L remains adhering to bearing surface 21 until the gripper 1 has been moved to the destination location, where the contact lens L is to be released from the gripper. Also, it is conceivable to apply the underpressure only during an initial phase of the gripping process, until the gripper 1 with the contact lens L adhered to bearing surface 21 has been moved out of the water contained in the test cell and that only then the a leakage stream of air is allowed to enter the interior 31 of the gripper body 3, so that water that has been sucked into the interior 31 of the gripper body 3 can be transported away through the underpressure tube 14 more efficiently.

During the transport of the contact lens L from the start location to the destination site, a predetermined time interval after the contact lens L has been taken out of the test cell, a test-underpressure can be applied through inlet port 42 and through detection tube 12, the distal end 120 of which is fittingly arranged in detection opening 222, so that there is no fluid communication between the distal end 120 of the detection tube 12 and the interior 31 of gripper body 3. With the aid of the test-underpressure it may be detected whether or not a contact lens L adheres to the bearing surface 21 of the gripper head 2 (see FIG. 6). When the gripper 1 has reached a location above the receptacle of a package into which the contact lens L is to be placed, application of underpressure is discontinued. The gripper head 2 is lowered towards the receptacle into which a small amount of storage liquid, for example 50 µl to 150 μl of saline, has been introduced, until the front surface of the contact lens L contacts the liquid. Due to the contact with the front surface of the contact lens L the storage liquid spreads over the front surface of the contact lens and adhesive forces caused by the contact of the front surface of the contact lens and the liquid are acting upon the contact lens.

To release the contact lens L from the bearing surface 21 of gripper head 2, the ejector pins 23 (see FIGS. 2 to 4) are actuated and moved into the ejection position. The contact lens L is thus mechanically displaced from the bearing surface 21, at least partially, but more preferably entirely. The contact lens is then supported only by the blunt free ends of the ejector pins (eventually by a small portion of the bearing surface in case the contact lens has not been entirely released from the bearing surface). Thus, the adhesive forces between the contact lens and the gripper 1 are very small, while on the other hand the adhesive forces between the contact lens and the storage liquid are much higher. Due to this difference in the adhesive forces acting on the contact lens, the contact lens is safely released from the gripper 1 and transferred into the receptacle. When the gripper 1 is moved back to its start location, the test-underpressure may be applied again in order to ascertain that the contact lens has been released.

Although the invention has been described with the aid of specific embodiments, it is evident to the person skilled in the art that this embodiment has been described by way of example only, and that various changes and modifications are conceivable without departing from the teaching underlying the invention. Therefore, the invention is not intended to be limited by the embodiment described, but rather is defined by the appended claims.

The invention claimed is:

1. A gripper (1) for a contact lens (L) comprising a gripper head (2) having a bearing surface (21) for the contact lens (L) to adhere thereto, and further comprising an ejector (23, 24) for mechanically displacing the contact lens (L), at least partially, away from the bearing surface (21); and wherein the ejector comprises a plurality of elector pins (23), the elector being actuatable such that the ejector pins (23) are movable from a rest position in which the ejector pins (23) do not interfere with the bearing surface (21), to an ejection position in which the ejector pins (23) axially protrude beyond the bearing surface (21), and vice versa.

2. The gripper according to claim 1, wherein in the rest position the ejector pins (23) are arranged in the interior of the gripper, and wherein the bearing surface (21) comprises a plurality of guide openings (223) through which the ejector pins (23) protrude axially beyond the bearing surface (21) when the ejector pins (23) are in the ejection position.

3. The gripper according to claim 2, wherein the guide openings (223), at least partially, form a part of the plurality of suction openings (22) in the bearing surface.

4. The gripper according to claim 2, wherein the ejector (23, 24) is mechanically, pneumatically, or hydraulically actuatable.

5. The gripper according to claim 1, wherein the bearing surface (21) comprises a plurality of suction openings (22) through which underpressure can be applied from the interior of the gripper (1) in order to suck the contact lens (L) against the bearing surface (21).

6. The gripper according to claim 5, wherein the bearing surface (21) further comprises a detection opening (222) through which a test-underpressure may be applied.

7. The gripper according to claim 6, further comprising a detection tube (12) being arranged in the interior of the gripper (1), with a distal end (120) of the detection tube (12) being connected with the detection opening (22) in a fluid-tight manner so as to allow application of the test-underpressure through the detection opening (22).

8. The gripper according to claim 5, further comprising a vacuum tube (14) extending through the interior of the gripper (1), a distal end (140) of the vacuum tube (14) being arranged in the interior of the gripper and at a short distance (s) from the plurality of suction openings (22) in the bearing surface (21) through which the underpressure can be applied for sucking the contact lens (L) against the bearing surface (21).

9. The gripper according to claim 8, further comprising a leakage stream channel (31) being connected with an inlet (443) for a leakage stream, the leakage stream channel (31) being in fluid connection with the plurality of suction openings (22) in the bearing surface and with the distal end (140) of the vacuum tube (14).

10. The gripper according to claim 1, wherein the ejector (23, 24) is mechanically, pneumatically, or hydraulically actuatable.

11. The gripper according to claim 1, wherein the plurality of ejector pins (23) are mounted on a common plunger (24) which is arranged axially displaceable in the interior of the gripper (1).

12. The gripper according to claim 1, wherein in the ejection position the plurality of ejection pins (23) axially protrude beyond the bearing surface (21) for a distance of 1 mm to 10 mm, in particular for a distance of 1 mm to 5 mm.

13. The gripper according to claim 1, wherein the bearing surface (21) is a convexly curved smooth surface.

14. The gripper according to claim 1, wherein the bearing surface (21) has an outer diameter (d) which is larger than that of a contact lens (L) to be sucked against the bearing surface (21).

15. A process for transporting a contact lens (L) from a start location to a destination location, the process comprising the steps of:
providing a gripper (1) according to claim 1,
positioning the gripper head (2) of the gripper at the start location with its bearing surface (21) adjacent to the contact lens (L) at a distance sufficiently close to the contact lens (L) to cause the contact lens to adhere to the bearing surface (21),
moving the gripper (1) together with the contact lens (L) adhered to the bearing surface (21) to the destination location, and
actuating the ejector (23, 24) in order to mechanically displace the contact lens (L) at least partially from the bearing surface (21) until the contact lens comes into sufficient contact with a receiving liquid at the destination location in order to release the contact lens (L) from the gripper (1).

* * * * *

UNITED STATES PATENT AND TRADEMARK OFFICE
CERTIFICATE OF CORRECTION

PATENT NO.        : 9,272,424 B2
APPLICATION NO.   : 14/482534
DATED             : March 1, 2016
INVENTOR(S)       : Roger Biel Page 1 of 1

It is certified that error appears in the above-identified patent and that said Letters Patent is hereby corrected as shown below:

Claims
Claim 1, line 6, (column 11, line 38), please change "elector pins (23), the elector" to --ejector pins (23), the ejector--.

Signed and Sealed this
Third Day of May, 2016

Michelle K. Lee
*Director of the United States Patent and Trademark Office*